United States Patent
Poyourow

(10) Patent No.: US 7,516,239 B2
(45) Date of Patent: Apr. 7, 2009

(54) TOOL FOR OPTIMIZING SYSTEM PERFORMANCE AND METHODS RELATING TO SAME

(75) Inventor: David Poyourow, Los Angeles, CA (US)

(73) Assignee: SAP, Aktiengesellschaft, Walldorf (DE)

( * ) Notice: Subject to any disclaimer, the term of this patent is extended or adjusted under 35 U.S.C. 154(b) by 379 days.

(21) Appl. No.: 11/026,523

(22) Filed: Dec. 30, 2004

(65) Prior Publication Data

US 2006/0149703 A1 Jul. 6, 2006

(51) Int. Cl.
- G06F 15/173 (2006.01)
- G06F 15/16 (2006.01)
- G06F 17/30 (2006.01)

(52) U.S. Cl. .................. 709/233; 707/10; 709/228

(58) Field of Classification Search .............. 709/217, 709/224, 228, 233; 707/10
See application file for complete search history.

(56) References Cited

U.S. PATENT DOCUMENTS

| | | | | |
|---|---|---|---|---|
| 5,027,348 | A * | 6/1991 | Curry, Jr. ................ | 370/445 |
| 5,408,470 | A * | 4/1995 | Rothrock et al. ........... | 370/261 |
| 5,452,299 | A * | 9/1995 | Thessin et al. ............ | 370/260 |
| 5,583,995 | A * | 12/1996 | Gardner et al. ........... | 709/219 |
| 5,680,573 | A * | 10/1997 | Rubin et al. .............. | 711/129 |
| 5,787,409 | A * | 7/1998 | Seiffert et al. ............ | 706/45 |
| 5,920,860 | A * | 7/1999 | Maheshwari et al. ........ | 707/5 |
| 5,999,943 | A * | 12/1999 | Nori et al. ............... | 707/104.1 |
| 6,061,678 | A * | 5/2000 | Klein et al. .............. | 707/3 |
| 6,078,919 | A * | 6/2000 | Ginzburg et al. .......... | 707/10 |
| 6,243,718 | B1 * | 6/2001 | Klein et al. .............. | 707/203 |
| 6,272,658 | B1 * | 8/2001 | Steele et al. ............. | 714/752 |
| 6,356,946 | B1 * | 3/2002 | Clegg et al. ............. | 709/231 |
| 6,445,717 | B1 * | 9/2002 | Gibson et al. ........... | 370/473 |
| 6,477,143 | B1 * | 11/2002 | Ginossar .................. | 370/230 |
| 2002/0091722 | A1 * | 7/2002 | Gupta et al. ............. | 707/204 |
| 2002/0136406 | A1 * | 9/2002 | Fitzhardinge et al. ....... | 380/210 |
| 2003/0195940 | A1 * | 10/2003 | Basu et al. ............... | 709/213 |
| 2004/0148272 | A1 * | 7/2004 | Raman et al. ............. | 707/1 |

(Continued)

OTHER PUBLICATIONS

Wang, Sheng-Yih and Bhargava, Bharat. "Multi-pass Transmission Policy: An effective method of transmitting large multimedia objects in the wide area network", The Twenty-First Annual International Computer Software and Applications Conference (COMPSAC) 1997 Proceedings, Aug. 1997, pp. 382-387.*

Primary Examiner—George C Neurauter, Jr.
(74) Attorney, Agent, or Firm—Dalina Law Group, P.C.

(57) ABSTRACT

Improved communication with a database comprising multiple clients utilizing multiple large data objects concurrently. For example when a client system interacts with a server with respect to a data object that is over a threshold size, the system may utilizing a communication methodology that minimizes system resource usage such as CPU and network utilization. When a client request for an object is within a size threshold, embodiments segment the object into smaller size chunks. Hence the server is not required to assemble all data associated with a request at once, but instead starts transmitting smaller segments. Allowing for transmission of smaller data chunks prevents allocating large blocks of memory to one object and although the server handles more memory allocations, each allocation is smaller and can be processed much faster. Chunk size may depend on environmental factors: time of day, day of week, number of users, number of predicted users.

14 Claims, 8 Drawing Sheets

U.S. PATENT DOCUMENTS

2004/0165610 A1* 8/2004 Chasin ................. 370/428
2005/0203673 A1* 9/2005 El-Hajj et al. ............ 701/1
2006/0271547 A1* 11/2006 Chen et al. ............ 707/10

* cited by examiner

TOOL FOR OPTIMIZING SYSTEM PERFORMANCE AND METHODS RELATING TO SAME

CROSS REFERENCE TO RELATED APPLICATIONS

U.S. patent application entitled "METHOD AND APPARATUS FOR MANAGING DATA OBJECTS IN A MULTI-USER ENVIRONMENT", filed Dec. 30$^{th}$, 2004 to the same inventor is hereby incorporated herein by reference.

BACKGROUND OF THE INVENTION

1. Field of the Invention

Embodiments of the invention described herein pertain to the field of computer software. More particularly, but not by way of limitation, one or more embodiments of the invention determine a blob chunk threshold and optional chunk transfer size to enable efficient communication with a database comprising binary large object (BLOB) data.

2. Description of the Related Art

Database systems generally provide the ability to permanently store and retrieve various types of data including characters, numbers, dates, objects, images, video and other types of data such as binary large object data. It has become increasingly more common as hard drive capacities and network bandwidth have continually increased for database users to store and retrieve large data objects such as multimedia including images, videos and audio. Storing and retrieving large data objects can inhibit the efficiency of a DBMS system and reduce overall system performance. This is because most database systems are not designed to handle widespread access to large data objects and hence there is a significant burden placed on the system when access to these large data objects becomes a regular part of day to day operations. This reduced performance during storage and retrieval of large objects is caused by a number of different factors.

When a large data object is retrieved by a client the database reads the entire object with one read operation. This retrieval operation in turn causes the database to allocate a segment of memory on the database server in which to read the entire data object being retrieved. On a small scale such allocations can reduce performance, but do not necessarily cause a substantial drop in overall system performance. However, when such requests become more common and many users across the entire system request large objects, systems are required to handle many threads asking for similar functions thus causing a significant reduction in system performance. If for instance, 30 users initiate requests to retrieve different PDF objects where each object is approximately 100 mb in size, then the server allocates approximately 3 Gb of memory. In many cases the occurrence of such an allocation requirement will impact system performance.

The impact of retrieving and storing large data objects on memory occurs when a database performs commands such as insert, update and select for example. Microsoft SQL Server, for instance, typically allocates 4 times the amount of memory of the object to be inserted. So in cases where a 50 MB object is to be inserted the server allocates approximately 200 MB of memory to the insert task. Another performance related problem that occurs when large data objects are transmitted between a client and server is that the transmission of such objects causes an increase in the number of network collisions which in turn places a noticeable burden on the network and reduces overall system efficiency.

To alleviate the burdens placed on a system when utilizing large blocks of data a technique known as "blob chunking" is used to read smaller blocks of data from a BLOB field until the entire BLOB field is read. Blob chunking may also be used to write a series of smaller blocks of data to a BLOB field until the entire BLOB field is written. To date there has been no way to intelligently determine the size of blocks to break a read or a write of a BLOB field into as current attempts at BLOB chunking merely attempt to allow a system to operate without returning an "out of memory" error for example. In addition, the threshold at which the blob chunking is utilized may not be the best size for transferring data to minimizing network utilization. The blob chunk size and transfer chunk size may differ as the memory of a database system and the network throughput of a system comprising the database have their own specific characteristics and utilizations that vary in time generally independently.

Because of the limitations described above there is a need for a system that can determine and optimize the blob chunk size threshold and optionally determine a transfer chunk size to allow greater efficiency in situations where large data objects are accessed and transferred between a server and a client.

SUMMARY OF THE INVENTION

One or more embodiments of the invention determine a blob chunk threshold and optional chunk transfer size to enable efficient communication with a database serving multiple large data objects to multiple clients. For example when a client system interacts with a server with respect to a data object that is over a threshold size, the system may employ a communication methodology that minimizes system resource usage such as CPU and memory utilization by breaking a database access into more numerous smaller accesses. Optionally, the smaller accesses may be broken or combined into transfer chunk sizes that optimize use of the network.

In one or more embodiment of the invention software elements are employed to monitor the database system memory utilization and CPU utilization and calculate a blob chunk size threshold. Optionally, a network software element is employed to determine the throughput and utilization of the network and calculate a transfer chunk size to use for network transfer of the data. Both the software element and the network software element may execute once at system startup, on an event basis or continuously at configurable intervals and field requests for blob chunk size and transfer chunk size. The software element and the network software element may utilize historical utilization information in order to predictively alter the blob chunk size and the transfer chunk size. When configured to access the calculated blob chunk size and optional transfer chunk size client machines and servers may communicate using smaller segments of data. Allowing for the access and transmission of smaller data chunks prevents the server from allocating large blocks of memory to one object and although the server may be required to handle more memory allocations, each allocation is smaller in size and can therefore be processed much faster.

The determination of the chunk size is dependent on inherent system resources such as the amount of server memory, and the available bandwidth of the network. In addition, the determination of chunk size is dependent on environmental factors such as the time of day, the day of the week, the number of users, the number of predicted users for a given time and day based on historical logging, and the current and predicted network utilization for a given time and day.

Software applications that utilize embodiments of the invention may or may not have knowledge of the underlying communications that make use of the blob chunk size and optional transfer chunk size. For example after a blob chunk size and optional transfer chunk size are calculated a server informs the client system it will be sending a multi-part object and also identifies the size the object will be upon reassembly and then transmits smaller data blocks back to the requesting client. Software applications may initiate requests to the server for a blob chunk size and optional transfer chunk size as well. For example the client machine may make a request to the server for a given object and obtain a message informing the client of the blob chunk size and optional transfer size at which time the client may request the blob chunks, each of which may comprise a different transfer chunk size that varies in time as the client and server CPU and memory utilization and network utilization changes or is predicted to change. The user of the client machine may or may not be aware that the blob chunk size and optional transfer chunk size exists as created and updated by one or more embodiments of the invention or that the data is being segmented and streamed for delivery through use of the blob chunk size or optional transfer chunk size quantities. Each block transferred may be of a different size than a previous or subsequent block as the optimal chunk size for a system may change over time depending on environmental factors. The change in block size may occur during the transmittal of a given data object meaning that for example the initial chunks sent may be smaller or larger than the subsequent chunks sent depending on the number of users or predicted number of users for a given time or any other factor related to the performance of the system.

Determining the optimal sizes for blob chunks and transfer chunks as described above is non-trivial since the optimal sizes vary according to the current utilization of the system and network in which blob chunking is utilized. Hence one aspect of the invention comprises use of averaging memory utilization over time to generate the blob chunk size and averaging the network utilization over time to generate a transfer chunk size. The window in which to average utilization can be configured at startup. In addition, historical utilization logs may be utilized in order to predictively calculate blob chunk size and transfer chunk size. Any mathematical function combining current utilization of memory with historical utilization of memory in generating a blob chunk size is in keeping with the spirit of the invention. In addition, any mathematical function combining current network utilization with historical network utilization in generating a chunk transfer size is in keeping with the spirit of the invention. Once the blob chunk size is calculated, applications may then use that size in packing, transmitting, unpacking, CRC error checking data to minimize memory utilization on the server.

There are several advantages in utilizing a blob chunk size and optional transfer chunk size, as calculated via one or more embodiments of the invention, with regards to large data objects. For instance, servers making use of these quantities can serve a larger number of requests for large objects before running out of memory. Because there is no need to allocate server memory for the entire object the system allows for greater efficiency in instances where the data is read from the server and passed onto the client. Another benefit occurs in that the number of network collisions is significantly reduced by transmitting large objects to a client in pieces according to the transfer chunk size, as calculated via one or more embodiments of the invention, rather than in larger segments. In addition, since the blob chunk size and optional transfer chunk size may dynamically change based on performance related quantities such as environmental factors, the system remains optimally responsive regardless of external events.

DETAILED DESCRIPTION OF THE INVENTION

A tool for optimizing system performance and methods relating to same will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
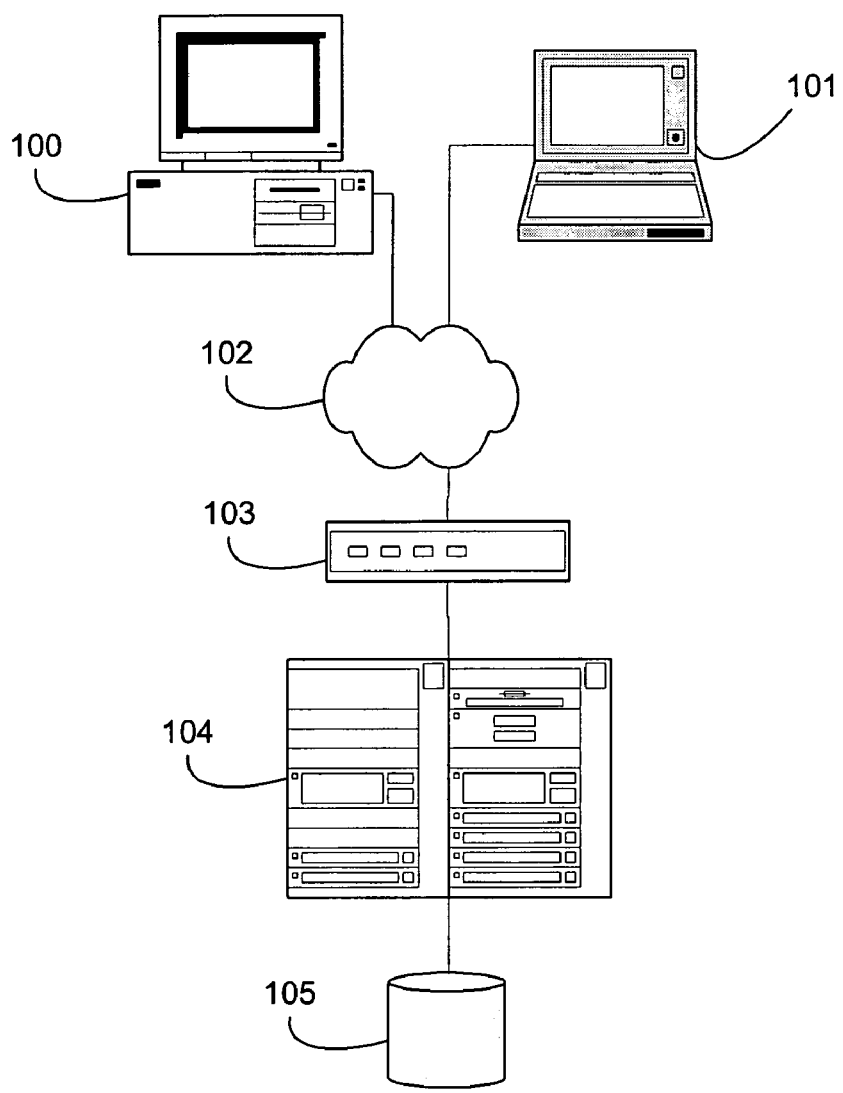
FIG. 1 illustrates a hardware architectural view of an embodiment of the invention.

FIG. 1 illustrates a hardware architectural view of a system that may make use of an embodiment of the invention to determine a blob chunk threshold and optional chunk transfer size to enable efficient communication with a database serving multiple large data objects to multiple clients. Client 100 and client 101 communicate with server 104 over network 102 via router 103 to obtain blob chunk size and transfer chunk size, retrieve and store data objects in database 105. For example when a client system such as client 100 and/or 101 interacts with server 104 with respect to a data object stored in database 105 that is over a threshold as per the blob chunk size, the system may utilize a communication methodology that takes into account the blob chunk size so as to minimize system resource usage such as CPU utilization, memory utilization and/or network utilization. The communication methodology is capable of transmitting data utilizing the blob chunk size or optionally a transfer chunk size each of which may change over time based on events that may alter the performance of the system.

Figure 2:
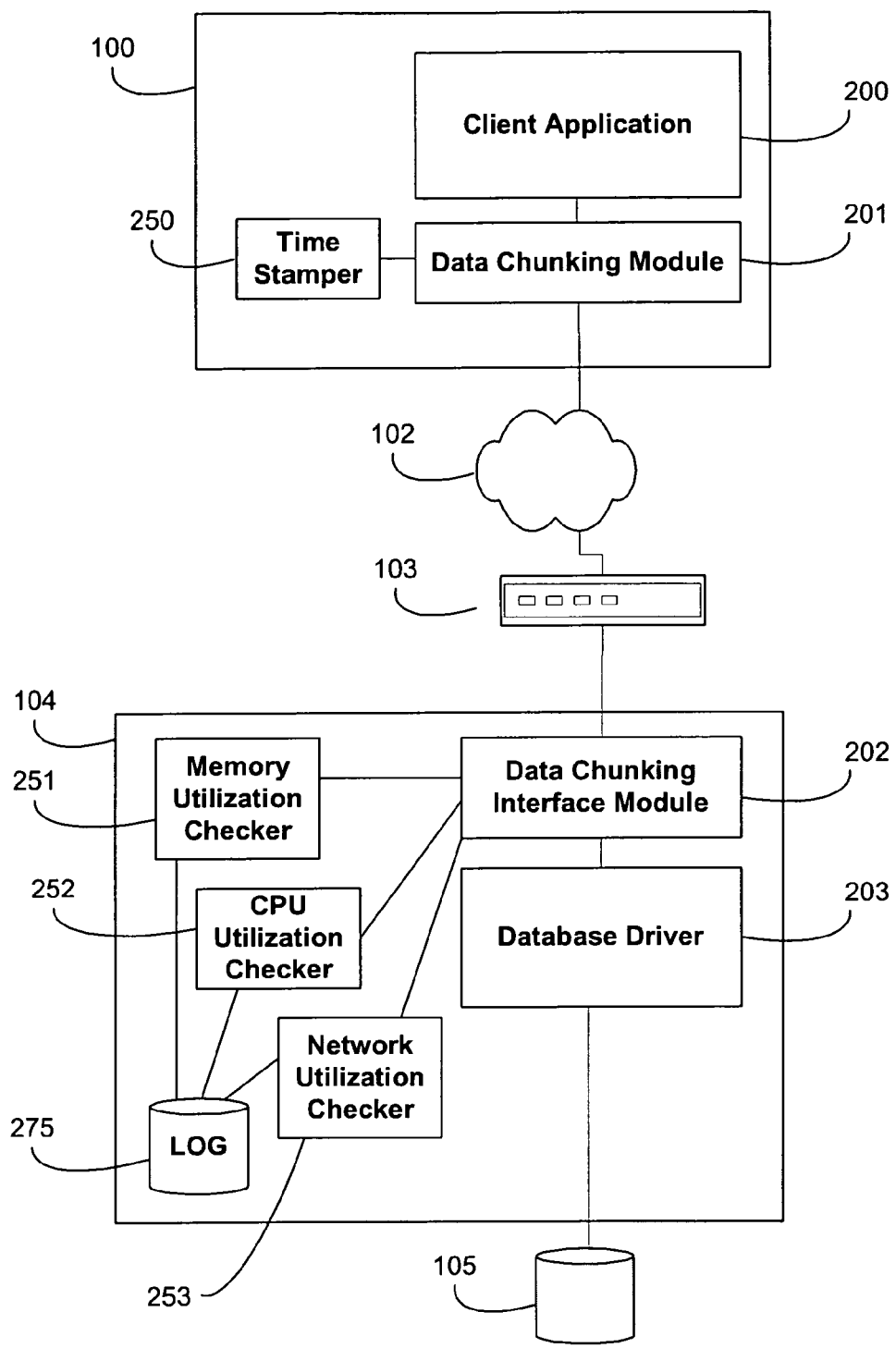
FIG. 2 illustrates an architectural view comprising software elements used in one or more embodiments of the invention.

FIG. 2 illustrates a software architectural view of one or more embodiments of the invention. Data chunking interface module 202 is capable of calculating a blob chunking size and optional transfer chunk size on command, as a result of an event or at timed intervals. The determination of the chunk size is dependent on inherent system resources such as the amount of server memory, and the available bandwidth of the network. In addition, the determination of chunk size is dependent on environmental factors such as the time of day, the day of the week, the number of users, the number of predicted users for a given time and day based on historical logging, and the current and predicted network utilization for a given time and day. In one or more embodiments of the invention the calculation of the chunk size takes into account the current state of the users and memory utilized in the system and the predicted number of users and memory and network bandwidth utilized based on historical observations. As the transfer of data chunks is spread over time, embodiments of the invention are capable of changing the chunk size and chunk size threshold dynamically while a transfer is taking place. Note that although a chunk size is used as a threshold and transfer size for data, these two elements may be of differing size as one skilled in the art will appreciate. For example, a chunk size of 100 MB may be used to segment any data object over 100 MB into chunks of 100 MB, or alternatively, a chunk size of 100 MB may be used to segment any data object over 100 MB into 25 MB transfer chunks. Regardless of the data chunk size or optional transfer chunk size, embodiments of the invention are capable of obtaining and utilizing these elements statically at configuration time or dynamically while running.

In one or more embodiments of the invention, data chunking interface module 202 calculates and provides access to the blob chunk size which is calculated in one or more embodiments according to the current memory utilization via memory utilization checker 251 and optionally CPU utilization checker 252. Memory utilization checker 251 may also determine the number of users on the system. Database driver 203 is queried to determine the number of database users that are currently coupled with the system. If the network utilization is low then the blob chunk size may be used as the transfer chunk size. Optionally, data chunking module 201 may request a maximum blob chunk size and transfer chunk size for example if client 100 has limited memory or communications capabilities. Therefore, blob chunk size and transfer chunk size may vary per client. If the current network utilization is high, then a transfer chunk size may be used for the size of the data chunks transferred between data chunking module 201 and data chunking interface module 202. In addition to using the current utilization values of the system, data chunking interface module 202 is capable of utilizing historical information in log 275. Log 275 may be implemented as one data repository as shown, or multiple independent logs that store utilization information related to the number of users, number of database users, memory utilization, CPU utilization and network utilization with respect to time. Using historical time stamped utilization quantities allows the system to predict for example that the period between noon and 1 PM for example comprises fewer database users and lower network utilization allowing for a higher blob chunk size equal to the transfer chunk size. Another example period may comprise alternate historical values, for example Monday at 3 PM which may comprise heavy usage of the network and medium utilization of the server memory allowing for a medium blob chunk size and a transfer chunk size calculated that differs from the blob chunk size and allows for more sparing use of the network.

Use of the blob chunk size is accomplished via data chunking module 201 and data chunking interface module 202. For example, in one embodiment of the invention when a client request from client application 200 for an object (such as a video stored in a database) falls within the relevant size threshold, data chunking module 201 and data chunking interface module 202 are capable of transferring the object between them using smaller size chunks. Hence server 104 is not required to assemble all data associated with a request at once, but is instead able to immediately start transmitting smaller segments of data to client 100. The chunking can be hidden from the user as when a database package is written to implement the chunking without the knowledge of a client, or with an interface that differs from the standard SQL interface. Regardless of the interface involved, any method of utilizing a chunk size threshold according to the description of the embodiments detailed herein is in keeping with the spirit of the invention. Allowing for the transmission of smaller data chunks prevents server 104 from allocating large blocks of memory to one object and although the server may be required to handle more memory allocations, each allocation is smaller in size and can therefore be processed much faster.

When utilizing embodiments of the invention, the latency between the time of the request and the delivery of data is typically low. Setting the transfer chunk size to a value smaller than the blob chunk size may decrease the latency of the first chunk of data arriving at client 100, however the overall time to send a blob may increase since more chunks are sent requiring more handshakes. In one embodiment of the invention when server 104 transmits smaller data blocks back to requesting client 100, server 104 informs client 100 that it will be sending a multi-part object and also identifies the size the object will be upon reassembly. Hence client 100 is made aware the request is being met by a stream of multi-part data to assemble rather than by a single object even though this may be transparent to the user of client 100. Each block transferred may be of a different size than a previous or subsequent block as the optimal chunk size for a system may change over time depending on environmental factors. The change in block size may occur during the transmittal of a given data object meaning that for example the initial chunks sent may be smaller or larger than the subsequent chunks sent depending on the number of users or predicted number of users for a given time.

Software applications that utilize embodiments of the invention may or may not have knowledge of the underlying communications that make use of the blob chunk size and optional transfer chunk size. For example after a blob chunk size and optional transfer chunk size are calculated by data chunking interface module 202 running on server 104 informs the client system (either client 100 or 101) that server 104 will be sending a multi-part object and also identifies the size the object will be upon reassembly and then transmits smaller data blocks back to requesting client 100. Software applications such as client application 200 may initiate requests to server 104 for a blob chunk size and optional transfer chunk size as well for example before sending information to server 104 for storage in database 105. For example client machine 101 may make a request to server 104 for a given object and obtain a message comprising the blob chunk size and optional transfer size at which time client 101 may request the blob chunks, each of which may comprise a different transfer chunk size that varies in time as the client and server CPU and memory utilization and network utilization changes or is predicted to change. The user of the client machine may or may not be aware that the blob chunk size and optional transfer chunk size exists as created and updated by one or more embodiments of the invention or that the data is being segmented and streamed for delivery through use of the blob chunk size or optional transfer chunk size quantities. Each block transferred may be of a different size than a previous or subsequent block as the optimal chunk size for a system may change over time depending on environmental factors. The change in block size may occur during the transmittal of a given data object meaning that for example the initial chunks sent may be smaller or larger than the subsequent chunks sent depending on the number of users or predicted number of users for a given time or any other factor related to the performance of the system.

Figure 3:
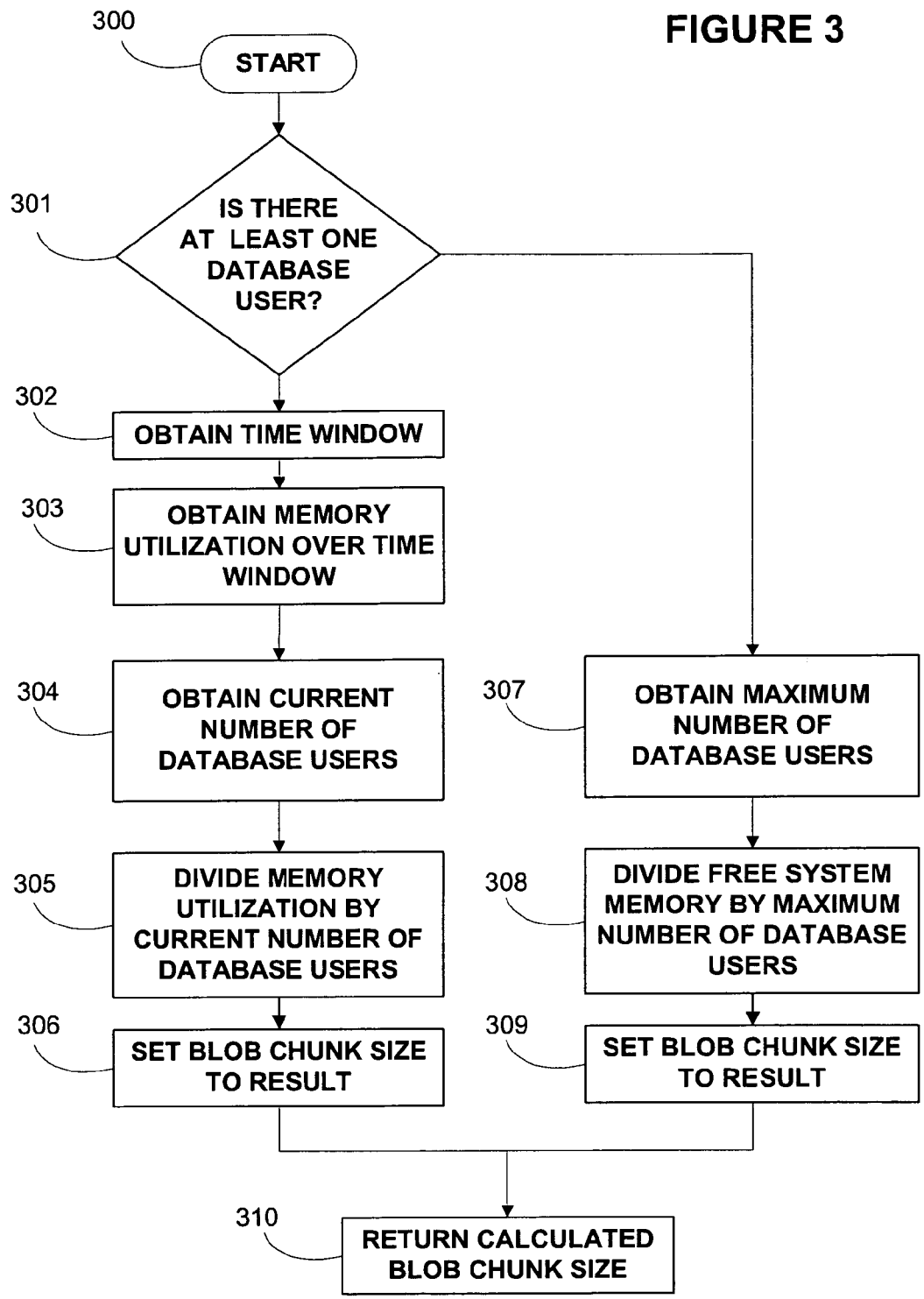
FIG. 3 illustrates a flow chart showing an embodiment of the method used in calculating a blob chunk size.

FIG. 3 illustrates a flow chart showing an embodiment of the method used in calculating a blob chunk size. This embodiment is exemplary in that any environmental quantity may be utilized in determining the blob chunk size. Processing starts at 300 and if there is at least one database user using the system then one embodiment of the invention obtains a time window at 302 over which a memory utilization is obtained at 303 as a number of Megabytes for example. The number of database users using the system is obtained at 304 or optionally stored as a result of the check at 301. The amount of memory available per database user is calculated by a division at 305 and the blob chunk size is set to the result of the division at 306. Optionally, the result of the division may be further divided by a configured constant in order to reserve memory to account for users that may begin using the database system with BLOBs. Although this is a first order result, it shows that the blob chunk size can be calculated using the current number of database users and the current amount of free memory in the system. If there are no current database users then the maximum number of database users possible as configured by the database manager is obtained at 307 and the current amount of free memory in the system is divided by the maximum number of database users at 308 in order to set the blob chunk size at 309. The calculated blob chunk size is returned at 310.

Figure 4:
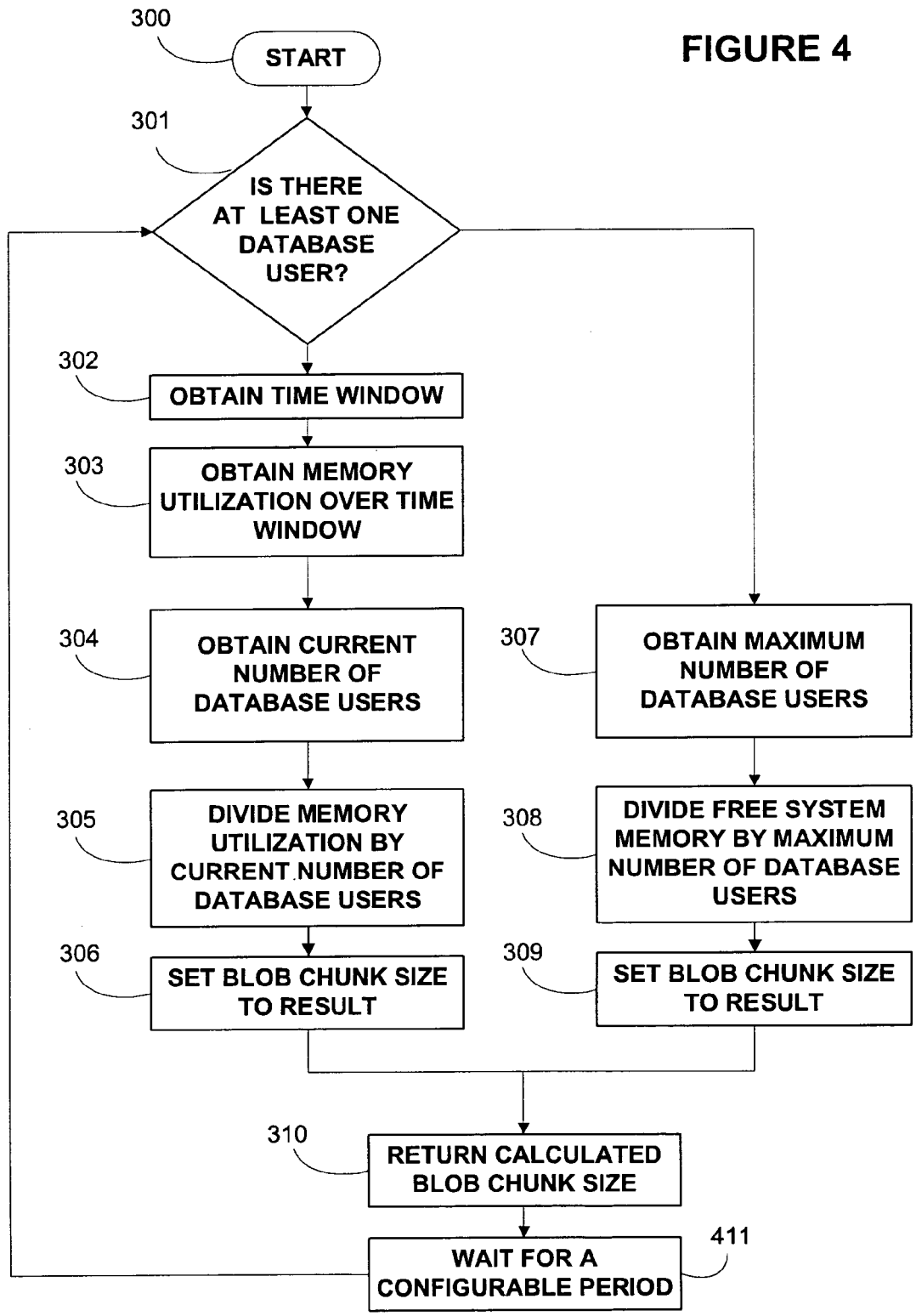
FIG. 4 illustrates a flow chart showing an embodiment of the method used in dynamically calculating a blob chunk size.

FIG. 4 illustrates a flow chart showing an embodiment of the method used in dynamically calculating a blob chunk size. This embodiment is exemplary in that any environmental quantity may be utilized in determining the blob chunk size. Processing starts at 300 and if there is at least one database user using the system then one embodiment of the invention obtains a time window at 302 over which a memory utilization is obtained at 303 as a number of Megabytes for example. The number of database users using the system is obtained at 304 or optionally stored as a result of the check at 301. The amount of memory available per database user is calculated by a division at 305 and the blob chunk size is set to the result of the division at 306. Optionally, the result of the division may be further divided by a configured constant in order to reserve memory to account for users that may begin using the database system with BLOBs. Although this is a first order result, it shows that the blob chunk size can be calculated using the current number of database users and the current amount of free memory in the system. If there are no current database users then the maximum number of database users possible as configured by the database manager is obtained at 307 and the current amount of free memory in the system is divided by the maximum number of database users at 308 in order to set the blob chunk size at 309. The calculated blob chunk size is returned at 310 and after a configurable time period the processing begins again at 301. This continual processing allows for dynamic updates of the blob chunk size as the number of users and the amount of free memory varies over time. Any transfers of data that are ongoing may optionally update to use the new blob chunk size for transferring data during the transfer or continue to use the previously set blob chunk size until the total transfer is complete. Any other function combining the amount of memory utilized by a current number or maximum number of users is in keeping with the spirit of the invention.

Figure 5:
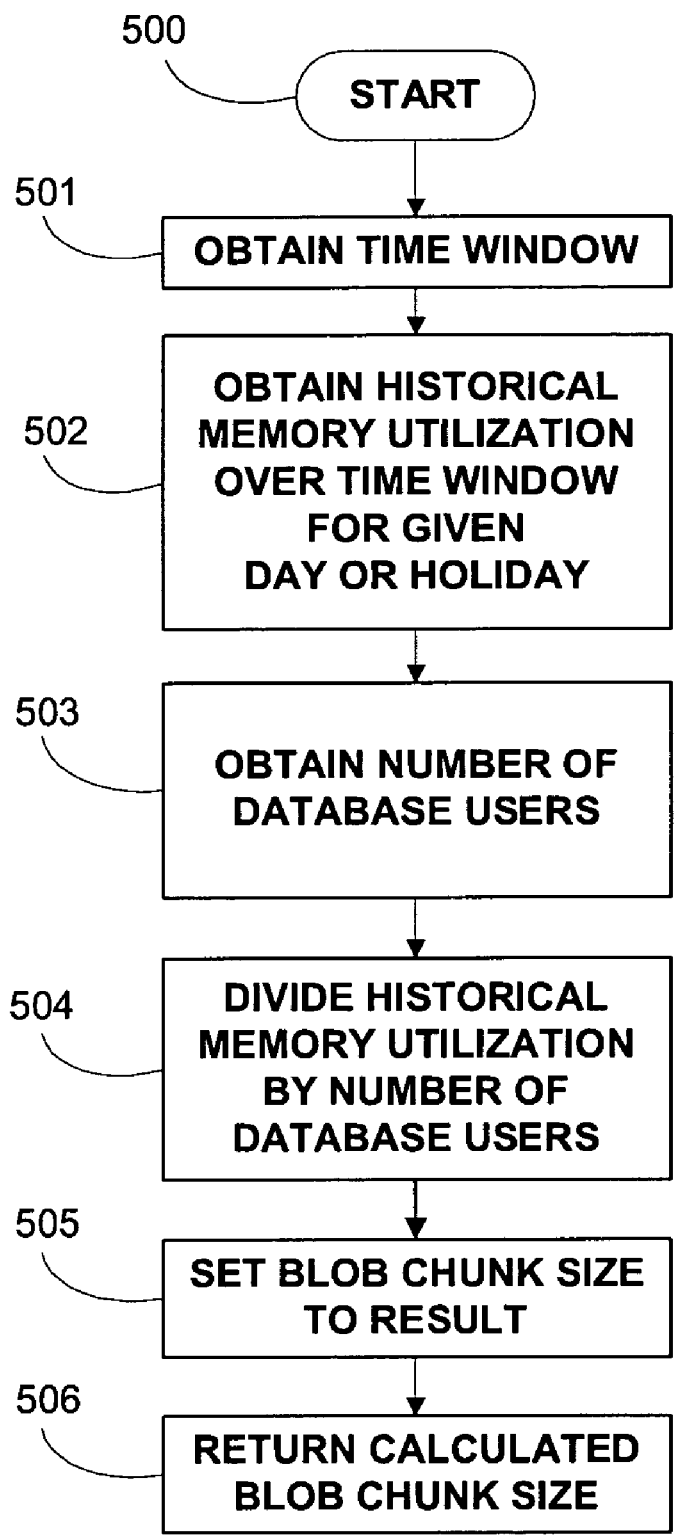
FIG. 5 illustrates a flow chart showing an embodiment of the method used in predictively calculating a blob chunk size.

FIG. 5 illustrates a flow chart showing an embodiment of the method used in predictively calculating a blob chunk size. This embodiment is exemplary in that any environmental quantity may be utilized in determining the blob chunk size. Processing starts at 500. One embodiment of the invention obtains a time window at 501 over which a historical memory utilization is obtained from log 275 at 502 as a number of Megabytes for example. The historical memory utilization may comprise a calendar based function that may determine if the last period, for example on a weekly basis, was a holiday. For example if the current time of day is 2 PM on a Friday, and if the previous Friday was a holiday, then the time period 2 weeks before the previous period may be utilized in obtaining historical memory utilization data. Alternatively, if the current day is a holiday and the previous weekly period did not comprise a holiday on the same day of the week, then the calendar function may be utilized in order to find the previous time period where a holiday occurred during the week and that historical memory utilization quantity may be obtained for the amount of the window desired as set in 501. The number of database users using the system is obtained at 503 or optionally the number of users using the system corresponding to the historical memory utilization period may be utilized. Alternatively, the maximum number of users may be utilized in the calculation at 504. The amount of memory available per database user is calculated by a division at 504 and the blob chunk size is set to the result of the division at 505. The result yields a predictive blob chunk size that corresponds to the amount of predicted traffic that the database system is likely to observe for the given day of the week and time of day, (holidays notwithstanding). Optionally, the result of the division may be further divided by a configured constant in order to reserve memory to account for users that may begin using the database system with BLOBs.

Figure 6:
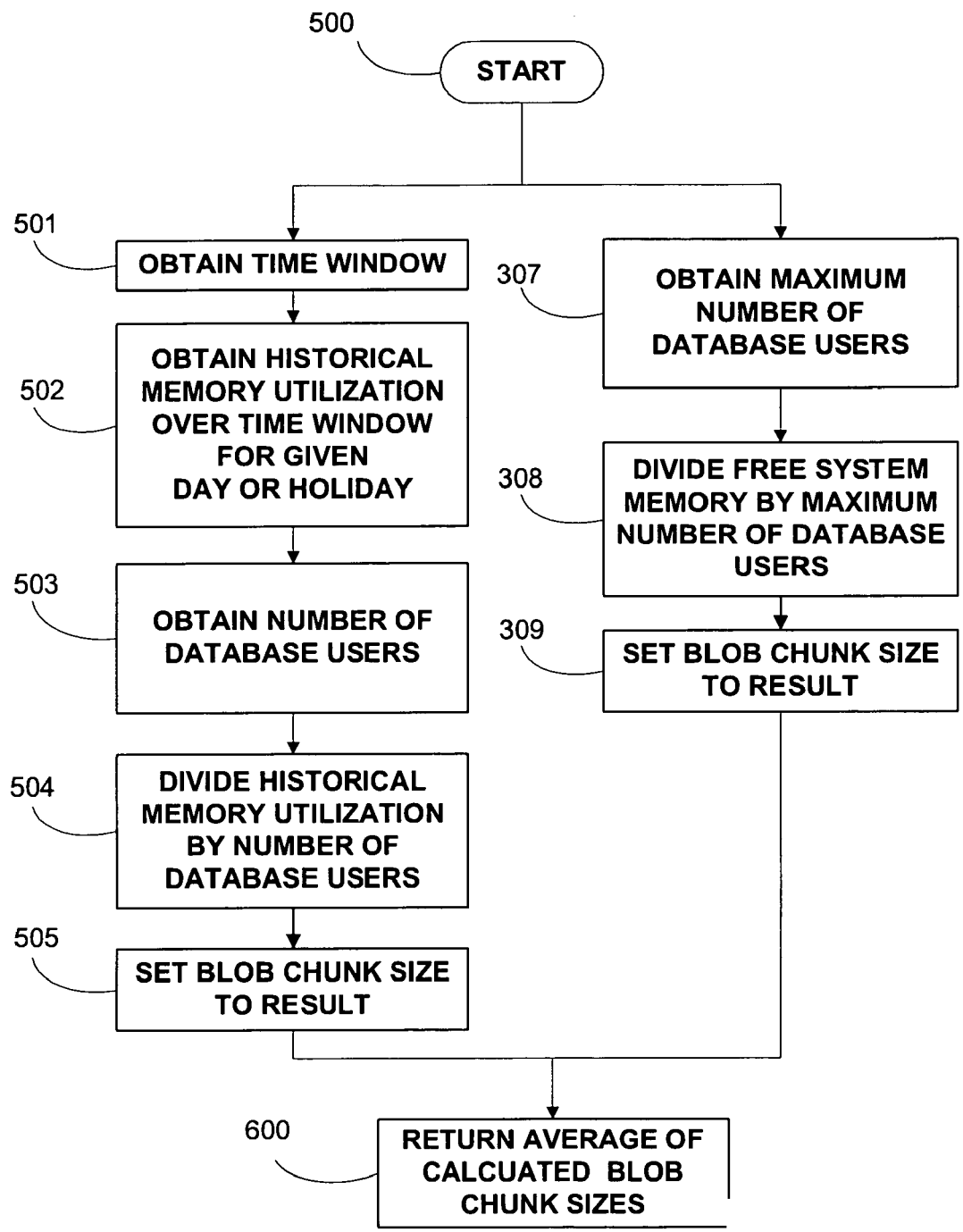
FIG. 6 illustrates a flow chart showing an embodiment of the method used in functionally calculating a blob chunk size.

FIG. 6 illustrates a flow chart showing an embodiment of the method used in functionally calculating a blob chunk size. This embodiment is exemplary in that any environmental quantity may be utilized in determining the blob chunk size. Processing starts at 500. One embodiment of the invention obtains a time window at 501 over which a historical memory utilization is obtained from log 275 at 502 as a number of Megabytes for example. The historical memory utilization may comprise a calendar based function that may determine if the last period, for example on a weekly basis, was a holiday. For example if the current time of day is 2 PM on a Friday, and if the previous Friday was a holiday, then the time period 2 weeks before the previous period may be utilized in obtaining historical memory utilization data. Alternatively, if the current day is a holiday and the previous weekly period did not comprise a holiday on the same day of the week, then the calendar function may be utilized in order to find the previous time period where a holiday occurred during the week and that historical memory utilization quantity may be obtained for the amount of the window desired as set in 501. The number of database users using the system is obtained at 503 or optionally the number of users using the system corresponding to the historical memory utilization period may be utilized. Alternatively, the maximum number of users may be utilized in the calculation at 504. The amount of memory available per database user is calculated by a division at 504 and the blob chunk size is set to the result of the division at 505. Concurrently or serially, the maximum number of database users possible as configured by the database manager is obtained at 307 and the current amount of free memory in the system is divided by the maximum number of database users at 308 in order to set the blob chunk size at 309. The resulting blob chunk size result set at 505 is averaged with the resulting blob chunk size set at 309 in order to produce a functionally calculated blob chunk size at 600. One skilled in the art will recognize that any function may be used in place of a simple average and may be weighted in terms of a probability that the predictive calculation of blob chunk size will be more or less accurate than the current available chunk size as calculated by 308. Optionally, the result of the functional calculation of 600 may be further divided by a configured constant in order to reserve memory to account for users that may begin using the database system with BLOBs and this constant may be derived by any method such as for example via an end of month flag that is set by a calendar function as a prediction of for example sales or marketing personnel attempting to close out their month ending projects which make use of BLOBs.

Figure 7:
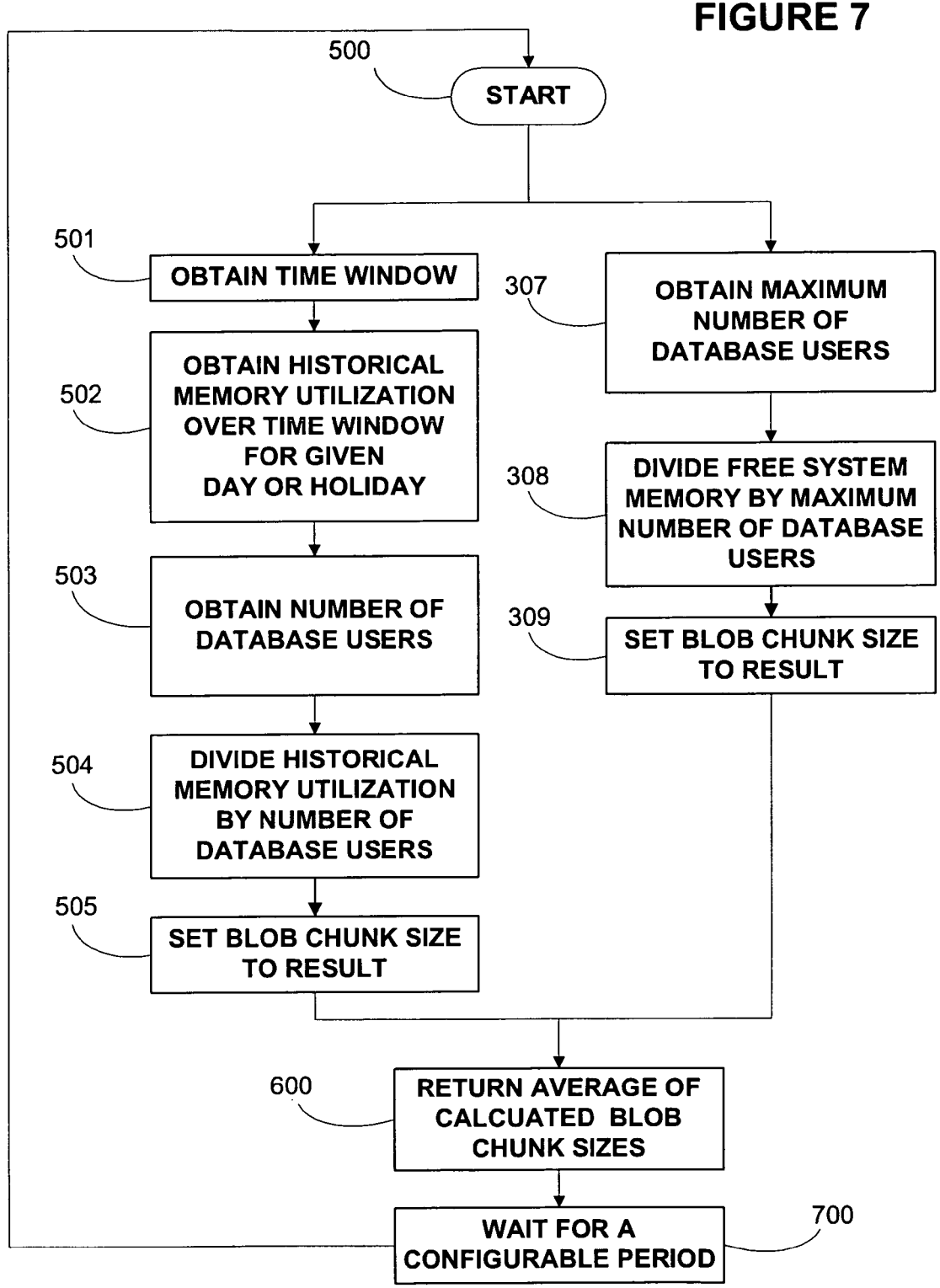
FIG. 7 illustrates a flow chart showing an embodiment of the method used in dynamically functionally calculating a blob chunk size.

FIG. 7 illustrates a flow chart showing an embodiment of the method used in dynamically functionally calculating a blob chunk size. This embodiment is exemplary in that any environmental quantity may be utilized in determining the blob chunk size. Processing starts at 500. One embodiment of the invention obtains a time window at 501 over which a historical memory utilization is obtained from log 275 at 502 as a number of Megabytes for example. The historical memory utilization may comprise a calendar based function that may determine if the last period, for example on a weekly basis, was a holiday. For example if the current time of day is 2 PM on a Friday, and if the previous Friday was a holiday, then the time period 2 weeks before the previous period may be utilized in obtaining historical memory utilization data. Alternatively, if the current day is a holiday and the previous weekly period did not comprise a holiday on the same day of the week, then the calendar function may be utilized in order to find the previous time period where a holiday occurred during the week and that historical memory utilization quantity may be obtained for the amount of the window desired as set in 501. The number of database users using the system is obtained at 503 or optionally the number of users using the system corresponding to the historical memory utilization period may be utilized. Alternatively, the maximum number of users may be utilized in the calculation at 504. The amount of memory available per database user is calculated by a division at 504 and the blob chunk size is set to the result of the division at 505. Concurrently or serially, the maximum number of database users possible as configured by the database manager is obtained at 307 and the current amount of free memory in the system is divided by the maximum number of database users at 308 in order to set the blob chunk size at 309. The resulting blob chunk size result set at 505 is averaged with the resulting blob chunk size set at 309 in order to produce a functionally calculated blob chunk size at 600. One skilled in the art will recognize that any function may be used in place of a simple average and may be weighted in terms of a probability that the predictive calculation of blob chunk size will be more or less accurate than the current available chunk size as calculated by 308. Optionally, the result of the functional calculation of 600 may be further divided by a configured constant in order to reserve memory to account for users that may begin using the database system with BLOBs and this constant may be derived by any method such as for example via an end of month flag that is set by a calendar function as a prediction of for example sales or marketing personnel attempting to close out their month ending projects which make use of BLOBs. The calculated blob chunk size is returned at 600 and after a waiting for a configurable time period at 700 the processing begins again at 500. This continual processing allows for dynamic updates of the blob chunk size as the number of users and the amount of free memory varies over time. Any transfers of data that are ongoing may optionally update to use the new blob chunk size for transferring data during the transfer or continue to use the previously set blob chunk size until the total transfer is complete. Any other function combining the amount of memory utilized and predicted amount of memory utilized is in keeping with the spirit of the invention.

Figure 8:
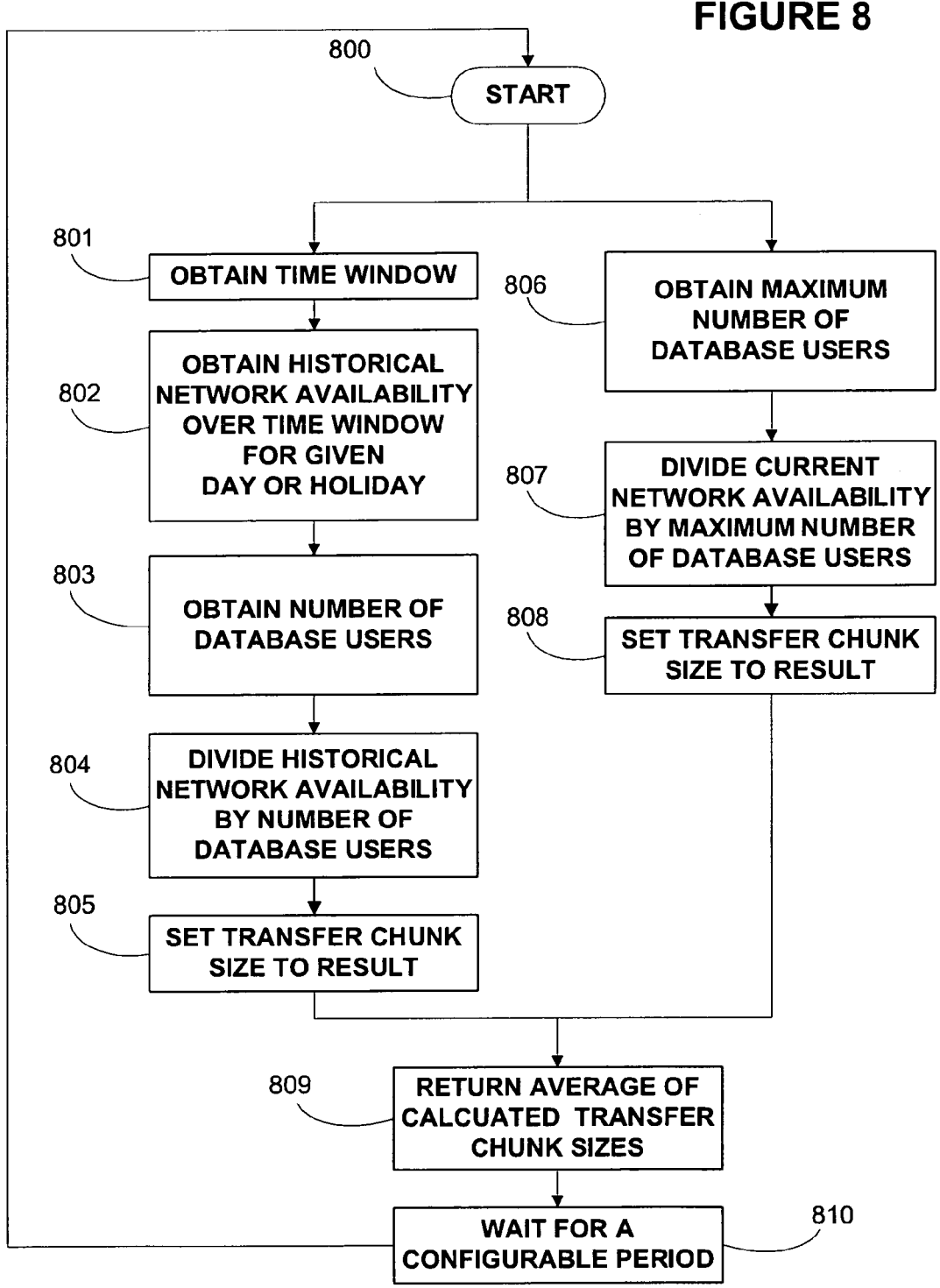
FIG. 8 illustrates a flow chart showing an embodiment of the method used in dynamically functionally calculating a transfer chunk size.

FIG. 8 illustrates a flow chart showing an embodiment of the method used in dynamically functionally calculating a transfer chunk size. This embodiment is exemplary in that any environmental quantity may be utilized in determining the transfer chunk size. Processing starts at 800. One embodiment of the invention obtains a time window at 801 over which a historical network availability is obtained from log 275 at 802 as a number of Megabytes per second for example. Log 275 may comprise utilization and the availability is the total network bandwidth minus the utilization. The historical network availability may comprise a calendar based function that may determine if the last period, for example on a weekly basis, was a holiday. For example if the current time of day is 2 PM on a Friday, and if the previous Friday was a holiday, then the time period 2 weeks before the previous period may be utilized in obtaining historical network availability data. Alternatively, if the current day is a holiday and the previous weekly period did not comprise a holiday on the same day of the week, then the calendar function may be utilized in order to find the previous time period where a holiday occurred during the week and that historical network availability quantity may be obtained for the amount of the window desired as set in 801. The number of database users using the system is obtained at 803 or optionally the number of users using the system corresponding to the historical network availability period may be utilized. Alternatively, the maximum number of users may be utilized in the calculation at 804. The amount of availability available per database user is calculated by a division at 804 and the transfer chunk size is set to the result of the division at 805. Concurrently or serially, the maximum number of database users possible as configured by the database manager is obtained at 806 and the current network availability is divided by the maximum number of database users at 807 in order to set the transfer chunk size at 808. The resulting transfer chunk size result set at 805 is averaged with the resulting transfer chunk size set at 808 in order to produce a functionally calculated transfer chunk size at 809. One skilled in the art will recognize that any function may be used in place of a simple average and may be weighted in terms of a probability that the predictive calculation of transfer chunk size will be more or less accurate than the current available transfer chunk size as calculated by 807. Optionally, the result of the functional calculation of 809 may be clipped to the blob chunk size or further divided by a configured constant in order to reserve network bandwidth to account for users that may begin using the database system with BLOBs and this constant may be derived by any method such as for example via an end of month flag that is set by a calendar function as a prediction of for example sales or marketing personnel attempting to close out their month ending projects which make use of BLOBs. The calculated transfer chunk size is returned at 809 and after a waiting for a configurable time period at 810 the processing begins again at 800. This continual processing allows for dynamic updates of the transfer chunk size as the number of users and the amount of network availability varies over time. Any transfers of data that are ongoing may optionally update to use the new transfer chunk size for transferring data during the transfer or continue to use the previously set transfer chunk size until the total transfer is complete. Any other function combining the amount of current network availability with the predicted network availability in calculating the transfer chunk size is in keeping with the spirit of the invention.

Thus embodiments of the invention directed to a tool for optimizing system performance and methods relating to same have been exemplified to one of ordinary skill in the art. The claims, however, and the full scope of any equivalents are what define the metes and bounds of the invention.

What is claimed is:

1. A method comprising:
    obtaining a time window via computer readable program code on a computer system comprising a client and a database server;
    obtaining a historic memory utilization of said database server over said time window and said database server's current memory utilization;
    computing a chunk size threshold for optimal performance in transferring binary large object data from said database server to said client, based on a historic network availability period and a current number of database users;
    performing a function to compute a chunk size for optimal performance in transferring binary large object data greater than said chunk size threshold from said database server to said client, said function based on an environmental factor, said current memory utilization, said historic memory utilization, and said current number of database users; and,
    using said chunk size and said chunk size threshold to transfer said binary large object data from said database server to said client.

2. The method of claim 1 further comprising:
    waiting for a configurable time period; and,
    repeating said method of claim 1.

3. The method of claim 1 wherein said environmental factor is a time of day.

4. The method of claim 1 wherein said environmental factor is a day of the week.

5. The method of claim 1 wherein said environmental factor is a number of users.

6. The method of claim 1 wherein said environmental factor is a number of predicted users.

7. The method of claim 1 wherein said environmental factor is based on a predicted network utilization.

8. A computer program product comprising:
    a computer usable memory medium having computer readable program code embodied therein wherein said computer readable program code comprises a data chunking interface module, said computer readable program code configured to:
    obtain a time window via said computer readable program code on a computer system comprising a client and a database server;
    obtain a historic memory utilization of said database server over said time window and said database server's current memory utilization;
    obtain a current number of database users;
    perform a function to compute a chunk size for transferring binary large object data from said database server to said client, said function based on an environmental factor, said current memory utilization said historic memory utilization and said current number of database users; and,
    use said chunk size to transfer said binary large object data from said database server to said client.

9. The computer program product of claim 8 wherein said computer readable program code is further configured to:
    wait for a configurable time period; and,
    repeat said steps of said data chunking interface module.

10. The computer program product of claim 8 wherein said environmental factor is a time of day.

11. The computer program product of claim 8 wherein said environmental factor is a day of the week.

12. The computer program product of claim 8 wherein said environmental factor is a number of users.

13. The computer program product of claim 8 wherein said environmental factor is a number of predicted users.

14. The computer program product of claim 8 wherein said environmental factor is a predicted network utilization.

* * * * *